US005822370A

United States Patent [19]

Graupe

[11] Patent Number: 5,822,370

[45] Date of Patent: Oct. 13, 1998

[54] COMPRESSION/DECOMPRESSION FOR PRESERVATION OF HIGH FIDELITY SPEECH QUALITY AT LOW BANDWIDTH

[75] Inventor: Daniel Graupe, Highland Park, Ill.

[73] Assignee: Aura Systems, Inc., El Segundo, Calif.

[21] Appl. No.: 632,914

[22] Filed: Apr. 16, 1996

[51] Int. Cl.[6] .......... H04B 1/66

[52] U.S. Cl. .......... 375/240; 704/205; 704/500

[58] Field of Search .......... 375/240; 704/205, 704/206, 203, 204, 500, 230; 379/93.08

[56] References Cited

U.S. PATENT DOCUMENTS

| | | | |
|---|---|---|---|
| 4,048,443 | 9/1977 | Crochiere et al. | 179/15 A |
| 4,370,524 | 1/1983 | Hiraguri | 179/15.55 |
| 4,866,777 | 9/1989 | Mulla et al. | 381/41 |
| 5,115,240 | 5/1992 | Fujiwara et al. | 341/51 |
| 5,617,507 | 4/1997 | Lee et al. | 395/2.09 |
| 5,621,850 | 4/1997 | Kane et al. | 395/2.15 |
| 5,625,743 | 4/1997 | Fiocca | 395/2.14 |
| 5,673,364 | 9/1997 | Bialik | 395/2.92 |
| 5,719,998 | 2/1998 | Ku et al. | 395/2.91 |

OTHER PUBLICATIONS

Mallat, "A Theory for Multiresolution Signal Decomposition: The Wavelet Representation", *IEEE Transactions On Pattern Analysis and Machine Intelligence*, vol. II, No. 7, Jul., 1989.

*Primary Examiner*—Stephen Chin

*Assistant Examiner*—Mohammed Ghayour

*Attorney, Agent, or Firm*—Sitrick & Sitrick

[57] ABSTRACT

The input signal is filtered by bandpass filters having different passbands. These filtered signals are input to power detectors that average the power present in each band. A comparator compares each power level signal to a predetermined power threshold to determine if information is present in any of the bands. If information is present in the upper bands, the information is transformed by a discrete wavelet transform and is thresholded and then shifted to the lower bands. The process by which the shifting operation was accomplished is stored in a code book band. An inverse wavelet transform generates the compressed signal by transforming the signals from the wavelet domain to the time domain. If the signal was compressed, the code book signal is transmitted with the compressed signal to a receiving unit for decompression. If the signal was not compressed, the code book signal and the original input signal is transmitted to the receiving unit. The receiving unit receives the transmitted signal and reconstructs the original input from the transmitted signal, either directly or by re-spreading and transforming the compressed signal from the transmitted signal responsive to the code book signal embedded with the transmitted signal.

34 Claims, 9 Drawing Sheets

Frequency Location Of Speech Phonemes
(ranges of spectrum where peak power of phonemes lies)

$P_A$ = denoting power in Band A etc.
a, $b_1$, $b_2$, etc: classification code symbol

| $P_A$ | $P_B$ | $P_C$ | $P_D$ | $P_E$ | Classifier Output |
|---|---|---|---|---|---|
| Any | Any | Any | No | No | a |
| Any | Any | Any | Yes | Yes | $b_1$ |
| Any | Any | Any | No | Yes | $b_2$ |
| Any | Any | Any | Yes | No | $b_3$ |

Power In Band vs. Classification Code Symbol

FIG. 4

| Classification Symbol | Decision On Band Shift In WT Matrix |
|---|---|
| a | no rearrangement |
| $b_1$ | First $W_B \rightarrow W_A$; then $W_C \rightarrow W_B$; then $W_D \rightarrow W_B$; then $W_E \rightarrow W_C$ |
| $b_2$ | First $W_B \rightarrow W_A$; then $W_C \rightarrow W_B$; then $W_E \rightarrow W_C$ |
| $b_3$ | First $W_B \rightarrow W_A$ then: $W_C \rightarrow W_B$<br>then: $W_D \rightarrow W_C$ |

$W_i$ = WT values in band i
$W_i \rightarrow W_j$: set WT values of row I (corresponding to band i) into row j (corresponding to band j)
The shifting of the "Codebook Signal" to $W_x$ occurs subsequent to execution of each of $b_i$, ($b_1$, $b_2$ and $b_3$).

FIG. 5A

Block Diagrammed State Flow Chart Of Signal Through The Compression System

Transmitter Side (compression)

Receiver Side (decompression)

Thresholding Scheme

COMPRESSION/DECOMPRESSION FOR PRESERVATION OF HIGH FIDELITY SPEECH QUALITY AT LOW BANDWIDTH

I. FIELD OF THE INVENTION

The present invention relates generally to signal spectra compression. More particularly, the present invention relates to compressing high fidelity speech into a normal telephone bandwidth.

II. DESCRIPTION OF THE RELATED ART

The basic telephone has changed little in the last 100 years. The bandwidth of telephonic communication has remained at about 3.5 kHz. Human speech, however, covers the bandwidth between 0.2 kHz and 8 kHz. Therefore, a telephone conversation does not transmit all the spectrum that is being spoken on one end and sounds unnatural.

The frequency spectrum illustrated in FIG. 4 shows the frequency band associated with a human voice. This spectrum is broken up into the voiced and unvoiced spectrum. The voiced spectrum, the vowels, starts at 0.20 kHz and goes to about 1.5 kHz. The unvoiced spectrum, the consonants, starts approximately at 1.5 kHz and goes to 8 kHz. All of these frequency cut-off points are approximate since they depend on the sex of the speaker and even differences in voice within the same sex.

The sounds above the 3.5 kHz point typically include the s, t, f, the, sh, ch, and c sounds. The sounds between 1.5 and 3.5 kHz typically include such sounds as k, l, m, and n. Since the frequency band of the telephone only reaches about 3.5 kHz, that information between 3.5 kHz and 8 kHz is lost.

Typically, the majority of households have at least one telephone and many households have two or more. Therefore, it would be very expensive if all of these phones had to be upgraded in order to communicate with high fidelity sound. There is a resulting need for an economical method and apparatus that compresses high fidelity sound into a 3.5 kHz bandwidth.

SUMMARY OF THE INVENTION

The present invention encompasses a spectra compression system for compressing the spectrum of an input signal. The system is comprised of an array of bandpass filters that each have a set bandwidth. A power detector is coupled to each bandpass filter of the array. Each power detector detects the power level of a filtered signal output from a bandpass filter. A comparator is coupled to each power detector and generates a decision signal dependent on the power level of the filtered signal. If the power detector detects a power level greater than a predetermined threshold, the comparator generates a "yes" signal. If the power level is not greater than the predetermined threshold, the comparator generates a "no" signal. In the preferred embodiment, the "yes" signal is a logical "1" and the "no" signal is a logical "0".

A classifier is coupled to the comparator. The classifier generates a classification signal dependent on the decision signals from the comparators. A code bandpass filter is coupled to the classifier and generates a code signal output that is indicative of the classification signal.

The filtered signals are run through a wavelet transform. This transforms each signal from the time domain to the wavelet domain. The wavelet domain signals are input to an information shifting circuit. If the classifier indicates an information shift is necessary, the shifting circuit moves the information in the signal from the higher band to a lower band. This forms three wavelet transforms that hold the information of the higher band wavelet transforms. The three remaining transforms are input to an inverse wavelet transform that generates the compressed signal to be transmitted.

The code signal is transmitted to a receiving unit. If the input signal was compressed, the compressed signal is transmitted to the receiving unit. If the input signal was not compressed, the original input signal is transmitted to the receiver unit. The receiving unit then uses the code signal to determine if the received signal is a compressed signal and where in the frequency band the information has been moved.

These and other aspects and attributes of the present invention will be discussed with reference to the following drawings and accompanying specification.

BRIEF DESCRIPTION OF THE DRAWINGS

FIG. 4 shows a table used by the classifier of FIG. 1 to generate the classification output signal band on power per band.

FIG. 5A shows a table of the rearrangement performed by the wavelet transform and band shift decision circuit.

DETAILED DESCRIPTION OF THE DRAWINGS

Figure 1:
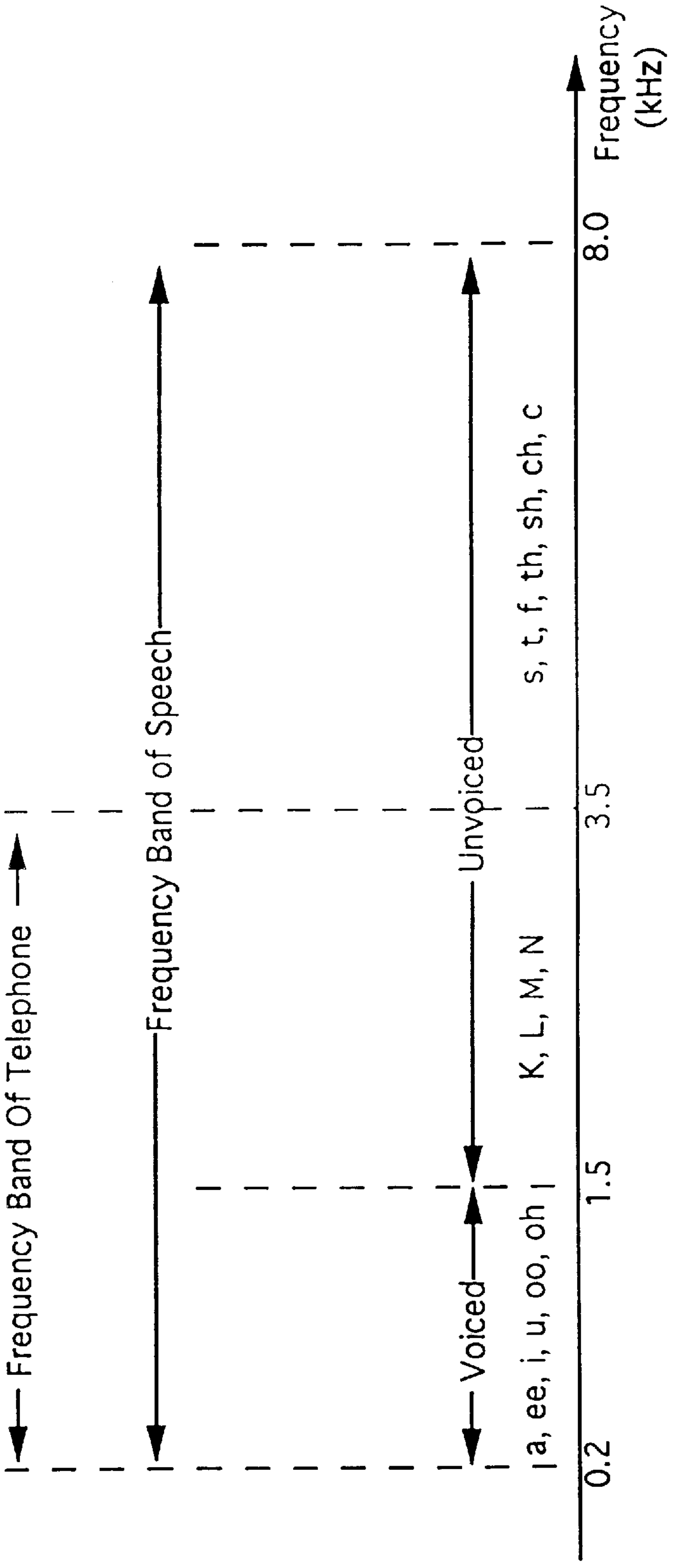
FIG. 1 shows a frequency allocation plot of voice signals.

While this invention is susceptible of embodiment in many different forms, there is shown in the drawings, and will be described herein in detail, specific embodiments thereof with the understanding that the present disclosure is to be considered as an exemplification of the principles of the invention and is not intended to limit the invention to the specific embodiments illustrated, and extends to any fixed bandwidth communications infrastructure.

The spectra compression and decompression system and method of the present invention provide an economical way to transmit a signal, having a spectrum greater than 3.5 kHz bandwidth, over a telephone line. By installing the present invention on both the transmitting and receiving ends, high fidelity sound may be communicated over the present telephone system.

Alternate embodiments can use the present invention in applications other than telephony. The present compression scheme can be used in any application where a signal must be compressed to a narrower bandwidth.

Referring to FIG. 1, a graph is provided illustrating the frequency location of speech phonemes, illustrating the ranges of spectrum where peak power of phonemes lies. As illustrated in FIG. 1, the frequency band of speech ranges from 200 Hz to 8 kHz. Voiced speech, such as "a", "ee", "i", "u", "oo", "oh", etc. occupy a lower band of the frequency band of speech, from approximately 200 Hz to 1.5 kHz. The unvoiced speech, consonants and combinations, occupy the remainder, with simple consonants such as "k", "l", "m", "n", occupying from 1.5 kHz to 3.5 kHz, while unvoiced sounds such as "s", "t", "f", "th", "sh", "ch", and "c" occupy from 3.5 kHz to 8 kHz. Since it is known where the peak power of phonemes lies within this range, and since during the interval of sampling which is sufficiently small, only a single phoneme is sampled, which occupies only a particular band within the frequency band of speech, it is possible by utilizing the present invention including band shifting and a code book signal transmission, along with the appropriate reception circuitry, to shift speech occurring in the upper bands of the frequency band of speech which occur above the range of the telephone (illustrated 200 Hz to 3.5 kHz) so that the entire range of 200 Hz to 8 kHz can be compressed and transmitted over a phone having a bandwidth from 200 Hz to 3.5 kHz.

Figure 2:
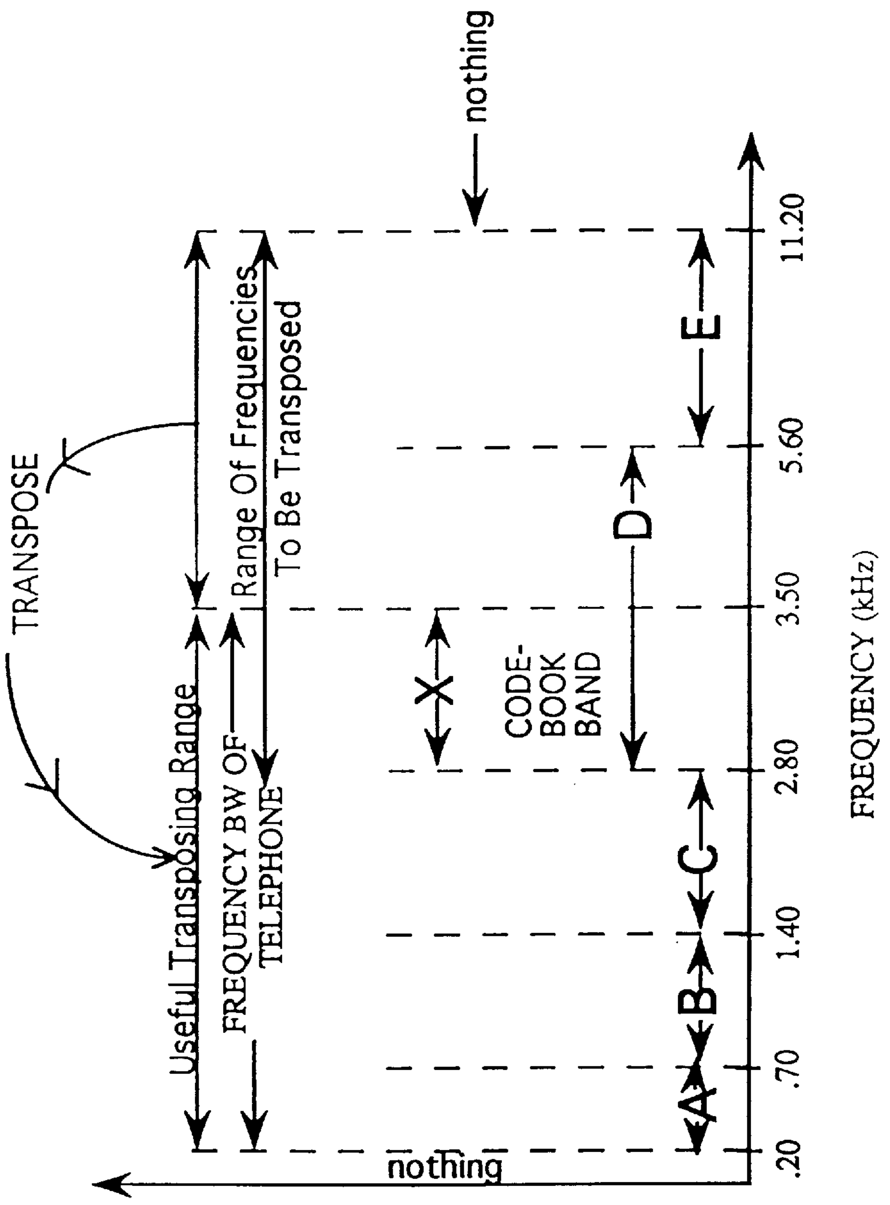
FIG. 2 shows a frequency band transposition allocation plot in accordance with the present invention.

The utilization of bands, and a codebook, and band shifting are illustrated in FIG. 2. FIG. 2 illustrates a frequency band transposition plot. The frequency band of speech, including the subset of the frequency bandwidth of the telephone are broken into a plurality of discrete bands illustrated as Band A from 200–700 Hz, Band B from 700–1400 Hz, Band C from 1.4 kHz to 2.8 kHz and Band X from 2.8 kHz to 3.5 kHz, Bands A, B, C and X in combination comprising the frequency band of the telephone, plus Band D comprising from 3.5 kHz to 5.6 kHz, and Band E illustrated as 5.6 kHz to 11.2 kHz. All bands below or above these bands are ignored. As illustrated in FIG. 2, the useful transposition range is Bands A, B and C. Bands X, D, and E are the range of frequencies which must be transposed for compression to occur. Band X is utilized as a codebook band to provide a coding signal for the code symbol which indicates what compression shift has occurred during the transmission compression process. For example, a sharp sine-wave can be utilized for each bit of a binary code signal. Thus, three sharp sine-waves (for example, one at 3 kHz, one at 3.1 kHz and one at 3.2 kHz, or a combination of the three, can be utilized to accommodate information of 8 code symbols having pre-defined meanings. The encoding and decoding systems of the transmitter and receiver must then utilize the same code book to indicate the compression and shifting process and therefore also the decompression and re-spreading process.

Figure 3:
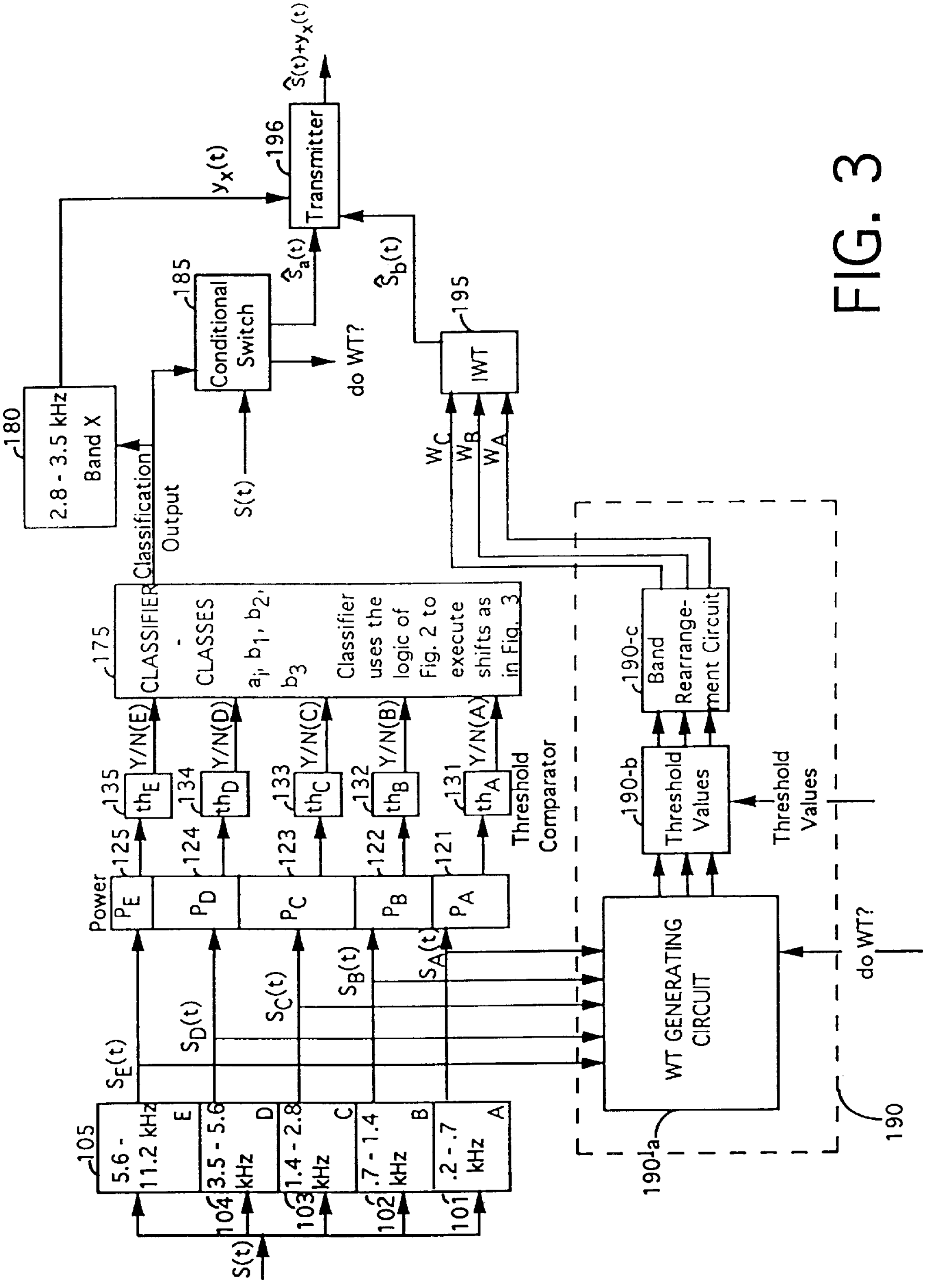
FIG. 3 shows a block diagram of the compression apparatus of the present invention.

A block diagram, of a specific embodiment of the spectra compression system of the present invention is illustrated in FIG. 3. The input signal of the present invention is denoted as S(t). In the preferred embodiment, S(t) is a digitized voice signal spoken by a telephone user. S(t), therefore, has the bandwidth of human speech.

In the preferred embodiment, the present invention is implemented in a digital signal processor (DSP). In this case, the input voice signal is sampled at a frequency of 22,400 Hz (twice the highest bandpass filter frequency of 11,200 Hz) and digitized by an 11-bit analog to digital converter before being operated on by the present invention. Alternate embodiments, however, implement the present invention in analog form so that the analog signal from the microphone can be used directly.

Also in the preferred embodiment, S(t) is input to an anti-aliasing filter having a cut-off of 11,200 Hz to yield the bands illustrated in FIG. 1. S(t) is also input to a high pass filter having a cut-off of 200 Hz to filter out the very low frequencies.

S(t) is input to an array of bandpass filters (101–105), each filter covering a different portion of the frequency spectrum. In the preferred embodiment, this array of bandpass filters (101–105) is comprised of five filters that have different passbands. The filters cover 200–700 Hz (101), 700–1400 Hz (102), 1400–2800 Hz (103), 2800–5600 Hz (104), and 5600–11,200 Hz (105). Each of these filters, therefore, allows only the information contained within its respective frequency band to pass through to its output. For simplicity, these bands are subsequently referred to as A, B, C, D, and E respectively.

The outputs of the bandpass filters, $S_A(t)$–$S_E(t)$, are each input to a respective power detector (121–125). Each power detector (121–125) determines if there is an information signal in any of the respective filtered signals output from the bandpass filters (101–105). Each power detector (121–125) measures the power in its respective spectrum, such as by squaring the amplitude of the filtered signal and averaging these signals over a time interval of T. This power detection is exhibited by the equation:

$$P_i = \frac{1}{T}\int_T S_1^2(t)dt$$

where T is an interval of 20 msec. in the preferred embodiment. Other embodiments use other time intervals for averaging the power.

The power detection signals, $P_A$–$P_E$ are input to a respective one of a number of threshold comparators (131–135), one comparator for each power detector (121–125). The comparators (131–135) generate a signal indicating whether the detected power in each filtered signal, $S_A(t)$–$S_E(t)$, is beyond a predetermined threshold. In the preferred embodiment, the predetermined threshold is 10% of the maximum power of the given band over a test run of 100 arbitrary words. Other embodiments use other thresholds. These decision signals are labeled Y/N(A), Y/N(B), Y/N(C), Y/N(D), and Y/N(E).

In the preferred embodiment, these signals are a logical "1" if that respective signal is greater than the threshold. The comparator output signal is a logical "0" if that respective signal is below the predetermined threshold.

An alternate embodiment uses only one power detector that is switched between the filtered signals $S_A(t)$–$S_E(t)$. This embodiment also uses one threshold comparator that is coupled to the one power detector. Other embodiments use different quantities of power detectors and threshold comparators.

Each of these decision signals are input to a classifier (175) that determines, from Y/N(A–E), if S(t) needs to be compressed. The classifier (175) uses the logic of the table illustrated in FIG. 4 to execute the shift, as set forth in the table of FIG. 5A to determine what is to be done to S(t) and can be implemented in hardware or software, such as using a DSP.

As can be seen in the table of FIG. 4, the logic for providing a classifier output is illustrated in the table on the power in the band versus the classification code symbol or classifier output. The power in the band is denoted by a "P", such that "$P_A$" denotes the power in Band A. The classifier outputs A, B1, B2, and B3 provide classification code symbol signal outputs. This is also designated $a/b_i$. The power in Bands A, B, and C can be of any level, and are essentially don't cares. This is because even if the wavelet transform space parameter values in a band is non-empty, due to the sparseness of the wavelet transform in each band, there is still room for wavelet transform parameters from other bands to be shifted over. This holds true for all the bands that may receive shifted wavelet transform "WT" parameters from higher bands. If both $P_D$ and $P_E$ are "no" signals, there is no need to compress S(t). Since, in this case, all the information is below the 3500 Hz point, this signal can be transmitted uncompressed without a loss of information.

If both $P_E$ and $P_D$ are "yes", S(t) is operated on by the band shift process $b_1$ illustrated in the table of FIG. 5A. In this case, power in the band between 5,600 Hz and 11,200 Hz is greater than the threshold power level, indicating information in that band. The information must be shifted down to a lower band as will be discussed subsequently. The information in band D is shifted down prior to the shift down from band E.

If $P_D$ is a "no" and $P_E$ is a "yes", S(t) is operated on by the band shift process $b_2$. This scenario indicates that there is information in band E and none in band D. The information in band E must be shifted down to a lower band to compress S(t).

If $P_D$ is a "yes" and $P_E$ is a "no", S(t) is operated on by the band shift process illustrated under $b_3$. In this case, there is information in band D but none in band E so only the information in band D needs to be shifted.

The classifier 175 of FIG. 3 uses the logic of FIG. 4 to cause the shifts and state flow of the logic shown in FIG. 5A. The classification signal generated by the classifier (175) is input to a code book bandpass filter (180) with a very sharp cut-off and having a pass band of 2800–3500 Hz, subsequently referred to as band X. This filter generates the code signal $y_x(t)$ that is coupled to the transmitter (196), and will be transmitted to the receiving unit to indicate to the receiving unit what shift operation was performed on S(t).

A conditional switch (185) has inputs of S(t) and the classification output signal $a/b_i$; i=1, 2, 3. This switch (185) generates an output signal designated $\hat{S}_a(t)$. If the classification output signal indicates that no compression shall be done on S(t), the conditional switch (185) allows S(t) to pass through to the switch output. If $a/b_i$ indicates that compression is going to be performed on S(t), the conditional switch (185) outputs a null signal. The Conditional Switch (185) output is coupled to the Transmitter (196).

Figure 6A:
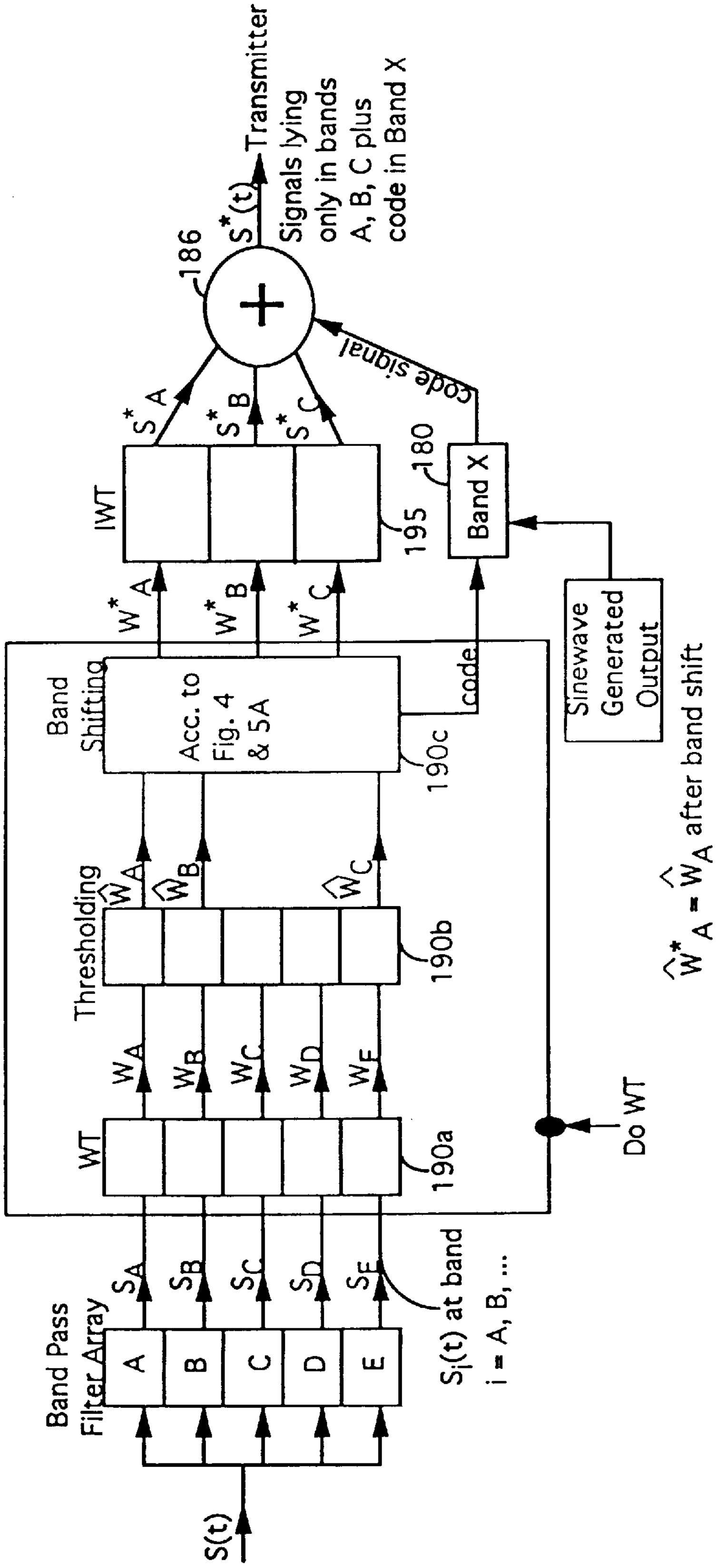
FIG. 6A shows a block diagram of a transmitter in accordance with the present invention.

Referring to FIGS. 1 and 6A, the filtered outputs, $S_A(t)$, $S_B(t)$, $S_C(t)$, $S_D(t)$, and $S_E(t)$, are also input to a wavelet transform (WT) circuit (190-*a*) whose output is then passed to a thresholding circuit (190-*b*) which outputs only wavelet values above a predetermined threshold value to block (190-*c*) which is a band rearrangement circuit. Also input to this block (190-*c*) is a $b_i$ signal from the conditional switch (185). The wavelet transform circuit (190-*a*) uses $b_i$ to determine whether or not to perform wavelet transforms on signals $S_{A-E}(t)$. If $b_i$ is a "0", no transforms are performed. If $b_i$ is $b_1$, $b_2$, or $b_3$, wavelet transforms are performed on $S_{A-E}(t)$ thereby creating the signals $W_A$, $W_B$, $W_C$, $W_D$, and $W_E$ respectively. Wavelet transforms are well known in the art as seen in the paper by Stephane G. Mallat, *A Theory for Multiresolution Signal Decomposition: The Wavelet Representation*, IEEE Transactions on Pattern Analysis and Machine Intelligence, Vol. 11, No. 7, July 1989, incorporated herein by reference.

FIG. 5 is exemplary of one case. As illustrated in FIGS. 5A and 6A, if $b_i$ indicates that S(t) is to be compressed under the $b_1$ process, the band rearrangement circuit (190-*c*) first shifts the spectrum of the output of both bands A and B into band A by compressing the spectrum of bands A and B by taking advantage of the property of WT of speech in narrow bands (such as in the present example) that if there is significant energy in the high frequencies (e.g. Bands D, E)

then the WT parameters in Band A or B, even if they exist above a reasonable threshold value, they occupy only a narrow section of the WT range at that band, such that there is sufficient unused band to shift WT parameters into it from a higher band. In practice one can always then consider the energy in Band A to lie in the lower or higher half of the WT of that band.

Figure 5B:
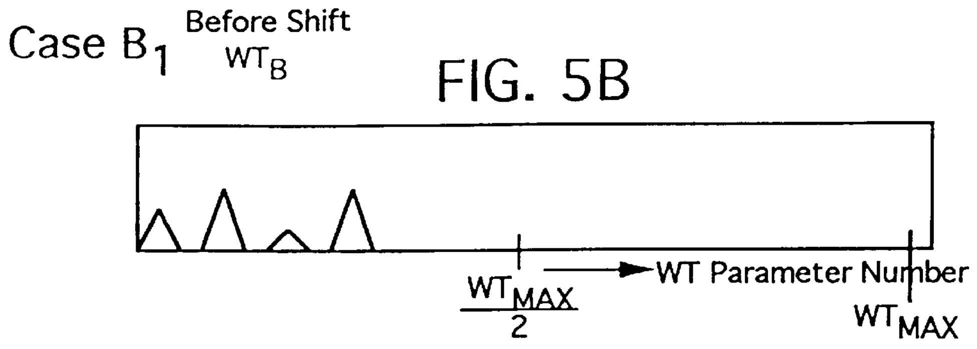
FIGS. 5B–D shows a spectrum plot illustrating the operation of one aspect of the invention in accordance with the logic of FIG. 4 and FIG. 5A.
Figure 5C:
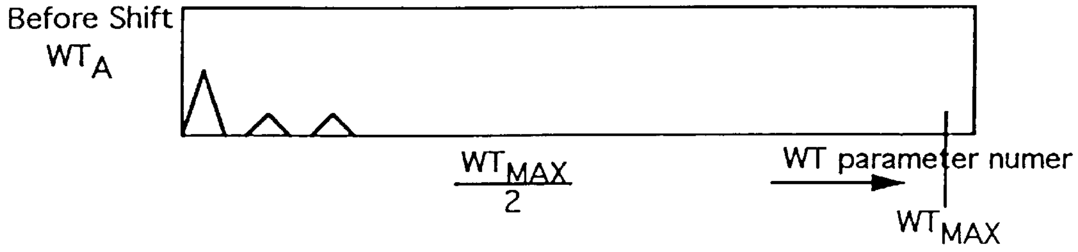
Figure 5D:
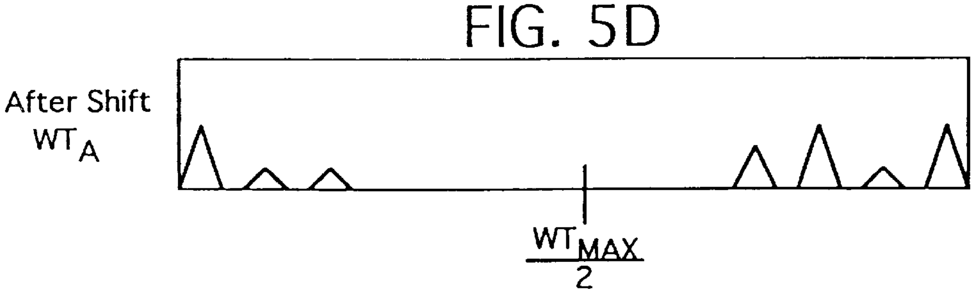

Referring to FIGS. 5B–D, a transform plot for wavelets illustrating the wavelet transform plots for Band B (FIG. 5B), and Band A (FIG. 5C) before the shift is performed, with FIG. 5D illustrating Band A after the shift is performed. The system of the present invention checks the wavelet transform space as illustrated in FIG. 5C to determine which half of the space the wavelet transforms for that band are predominantly present in. As illustrated in FIG. 5C, the wavelet transform parameter numbers for Band A before the shift are in the lower half of the wavelet transform parameter numbers comprising the range from zero to the wavelet transform parameter value maximum, illustrated with a threshold at the wavelet transform maximum divided by two. Since the upper half of the transform space of FIG. 5C is available, the wavelet transform parameter values of FIG. 5B representing the wavelet transform values in Band B, are shifted by the system of the present invention to occupy the wavelet transform space for Band A which is not used by the wavelet transforms from Band A, resulting in a compressed signal in Band A representing both the wavelet transforms of Band A and the wavelet transforms of Band B as illustrated in FIG. 5D. This leaves band B empty. $W_C$ can now be shifted to Band B, and $W_D$ can now be shifted to band B. This leaves band C empty. $W_E$ is then shifted to band C. The selection for $b_i$ of which bands are mapped to which bands for compression has many options. However, the codebook on each end must be fore the same mapping option.

If $b_i$ is equal to $b_2$, $W_B$ is shifted to band A as in $b_1$, then $W_C$ can be shifted into band B and $W_E$ can be shifted into $W_C$. If $b_i$ is equal to $b_3$, $W_B$ is shifted to band A as in the first two operations so that $W_C$ can be shifted to band B and $W_D$ can be shifted to band C.

The above shifting operations can be more easily visualized by reference to the frequency band plot of FIG. 2. Each of the frequency bands A–E as well as the code book band X are shown on this plot.

After the band rearrangement circuit (190-*a*) has completed its operation, only three wavelet transform values will remain since all of the wavelet transforms have been shifted down to the A, B or C bands. This is of course true only if code signal ($b_i$) instructed the WT and band rearrangement circuit (190) to perform a compression.

Referring again to FIG. 3, $W_A$, $W_B$, and $W_C$ are input to an IWT (Inverse Wavelet Transform stage (195) that generates the signal $\hat{S}_b(t)$. This signal is the result of an inverse wavelet transform being performed on the three input signals. This transform is well known in the art as can be seen in the Mallat paper mentioned above. The IWT stage (195) is the inverse operation of the WT (190-*a*) stage.

The signals $\hat{S}_a(t)$, $\hat{S}_b(t)$ and $y_x(t)$ are input to a transmitter (196). The transmitter outputs a signal $\hat{S}(t)+y_x(t)$. If compression was not performed on the input signal the transmitter is simply transmitting the input signal, S(t), plus the code book signal, $y_x(t)$. The code book signal instructs the receiving unit that the information signal received has not been compressed and therefore does not need to be decompressed.

If the input signal has been compressed, $\hat{S}_b(t)$ is transmitted along with $y_x(t)$. $\hat{S}_a(t)$ is not transmitted as it is a null signal. The receiving unit then uses $y_x(t)$ to decompress and reconstruct the original signal. An indication of which shifting operation was performed is stored in band X discussed above. This informs the receiving unit as to which shifting process was used on the input signal. The receiving unit then performs the reverse process, of that illustrated in the table of FIG. 5A, to decompress the received signal $\hat{S}(t)$.

Referring to FIG. 6A, a transmitter side "compression" apparatus block diagram and process state flow chart of the signal passing through the compression system is illustrated. FIG. 6A substantially corresponds to the WT and wavelet band rearrangement subsystem 190 of FIG. 3, with similarly numbered blocks corresponding exactly. The input signal S(t) is coupled to the bandpass filter array (105) to generate bandpass filter output signals $S_a$, $S_b$, $S_c$, $S_d$, $S_e$, corresponding to the signals from each of the bandpass filters for Bands A, B, C, D, and E respectively. Responsive to the wavelet transform signal output generated by the conditional switch, or responsive to the classification output from the classifier (175) of FIG. 3, the WT and wavelet band rearrangement subsystem (190) initiates wavelet transforms and band rearrangement. First, the wavelet transform circuitry (190) performs a wavelet transform on each of the signals $S_a$–$S_e$ to generate wavelet transform parameters signal outputs $W_a$–$W_e$ respectively, for each of the Bands A–E respectively. The wavelet transform outputs $W_a$–$W_e$ are coupled and input to a thresholding subsystem (190*b*) which passes through and processes the wavelet transform outputs to generate a thresholded wavelet transform output for each of the bands, $\hat{W}_a$–$\hat{W}_e$. Only wavelet parameters exceeding the predetermined threshold are passed through and become part of the thresholded wavelet transform signals. The wavelet threshold levels are pre-defined values, and in a preferred embodiment are set separately for each of the bands. The thresholded wavelet transform parameter outputs are coupled as inputs to the band shifting and re-arrangement circuitry (190*c*), which operates pursuant to the logic of FIGS. 4 and 5A to effectuate band shifting in accordance therewith, and provides as outputs the band shifted and combined wavelet transform parameters $\hat{W}^*_a$–$\hat{W}^*_c$. These outputs are coupled to an inverse wavelet transform subsystem (195), which outputs compressed signals $S_a^*$, $S_b^*$, and $S_c^*$ in Bands A, B, and C respectively. Additionally, as illustrated in FIG. 6A, the bandshifting sub-system (190*c*) also generates a code output signal to a Band X filter output, which Band X sub-system (180) is also coupled to a sinewave generator. As discussed elsewhere herein, in one embodiment the code signal is used to generate three sinewaves within the Band X range which represent the code symbol for the code table entry. Using the three sine-wave signals permits code information representative of 8 code signals. The signal outputs for Bands A, B, C and X, Signals $S^*_A$, $S^*_B$, $S^*_C$, and CS are combined at sub-system (186) to provide the compressed signal S*(t) which lies entirely in Bands A, B, C, and X. These signals are coupled to transmitter circuitry as appropriate for modulation, further encoding, and transmission.

Figure 6B:
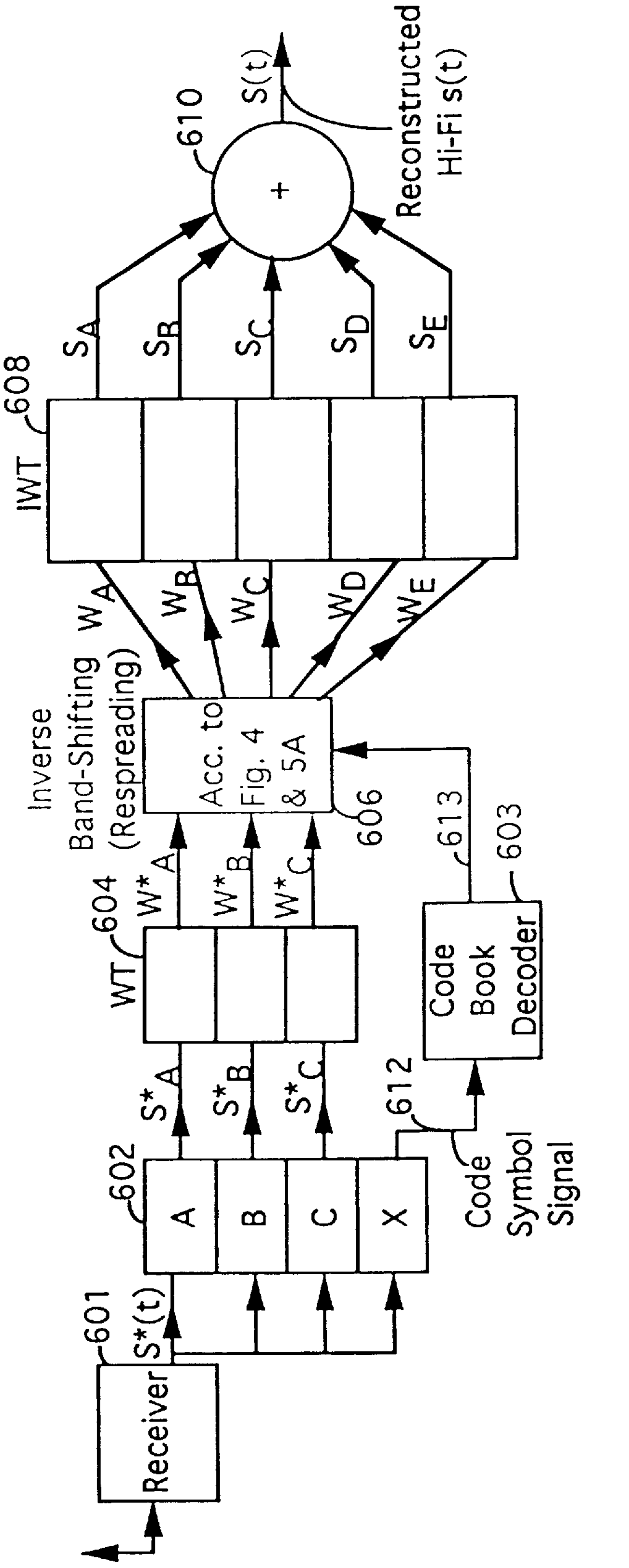
FIG. 6B shows a block diagram of embodiments of a receiver system in accordance with the present invention.

FIG. 6B illustrates a block diagram of a receiver (decompressing) apparatus. This apparatus is comprised of a receiver (601) that receives the transmitted signal and demodulates it. The demodulated signal S*(t) is input to an array of band pass filters (602) for the bands A, B, C, and X as discussed above providing filter output signals $S^*_A$, $S^*_B$, and $S^*_C$, respectively. These signals $S_A^*$, $S_B^*$, and $S_C^*$ (in the A, B, and C band) are input to a wavelet transform circuit (604) that performs the wavelet transform on these signals to provide receiver wavelet transform parameter outputs $\hat{W}_A^*$, $\hat{W}_B^*$, and $\hat{W}_C^*$ for Bands A, B, and C, respectively. The X-band output (612) of the X-band filter (602X) is input to a code classification circuit (603) to determine the code that was imbedded in the transmitted signal to provide a classification code signal (613).

The code signal (613) is used by the Band Rearrangement Logic (605) to determine whether to respread the received signal and, if so, which parts of the band to move from-where to-where, in accordance with the code book decode logic and respreading logic as illustrated in the tables of FIGS. 4 and 5A and discussion thereof.

If respreading is to occur, the wavelet parameters are appropriately shifted from and to the proper bands to provide respread wavelet outputs $\hat{W}_A$ to $\hat{W}_E$ for Bands A–E, respectively, forming the respread wavelet signal. The respread wavelet signal is operated on by an inverse wavelet transform system (606) that transforms the wavelet domain signals into $\hat{W}_A$, $\hat{W}_B$, $\hat{W}_C$, $\hat{W}_D$, and $\hat{W}_E$ decompressed time domain signals $\hat{S}_A$, $\hat{S}_B$, $\hat{S}_C$, $\hat{S}_D$, and $\hat{S}_E$, respectively, which time domain signals are summed by the summing circuit (610) to provide a reconstructed hi-fi signal $\hat{S}(t)$ representative of the original hi-fi signal S(t).

Figure 6C:
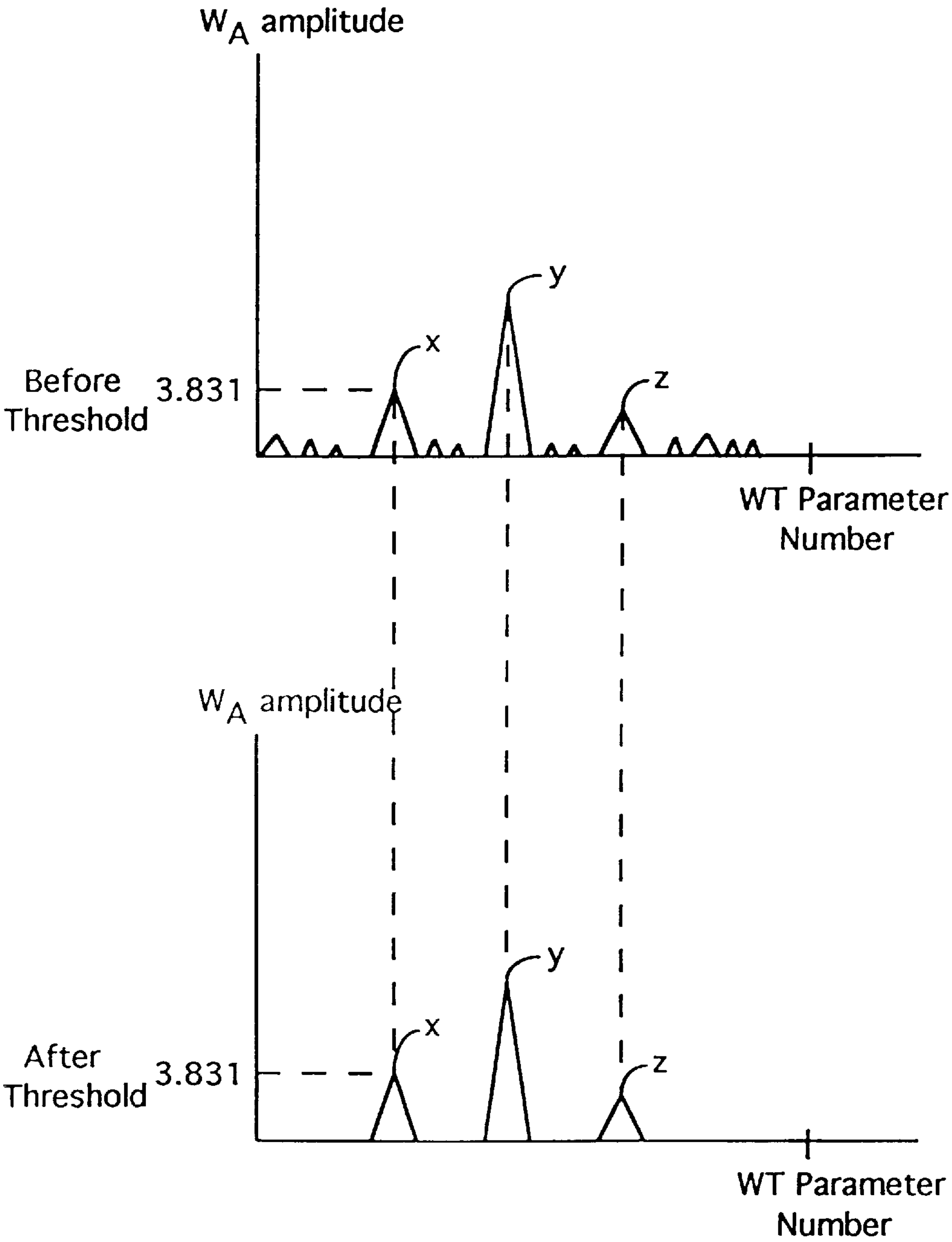
FIG. 6C shows a thresholding plot.

FIG. 6C illustrates the process of thresholding as described with reference to FIG. 6A thresholding subsystem (190*b*). As illustrated in FIG. 6C, the Band A wavelet transform parameter space is illustrated before thresholding and after thresholding. In each of the spaces, both before and after thresholding, the value of the wavelet transform parameter numbers which exceed the threshold for those major parameters X, Y, and Z remain constant before and after thresholding. The drawing in FIG. 6C illustrates wavelet transform parameter amplitude for wavelet transform $W_A$ (before thresholding) and $\overline{W}_A$ (the wavelet transform output after thresholding). For all wavelet transform parameters having an amplitude greater than a predefined threshold, the after threshold wavelet transform parameter value at any point in the wavelet transform space is unchanged. Otherwise, the transformed value is zeroed. Thus, all wavelet transform parameter numbers below the threshold are eliminated by the thresholding operation. The inverse wavelet transform of the thresholded wavelet transform output $\overline{W}_A$ is substantially equal to the inverse wavelet transform of the non-thresholded wavelet transform output ($W_A$), except for an insignificant error (e.g. less than 1%). However, the thresholding permits more effective band-shifting operation, while introducing no significant error problem.

Figure 7:
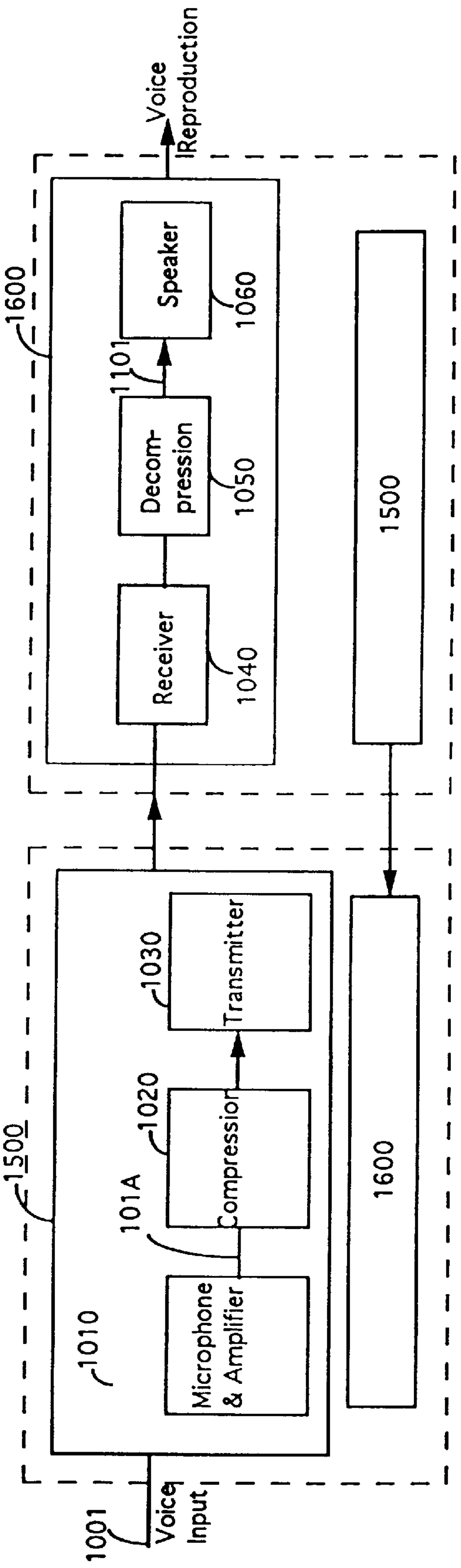
FIG. 7 shows a block diagram of a telephony embodiment.

Referring to FIG. 7, a block diagram illustrates a telephony embodiment utilizing the spectral compression/decompression of the present invention. A voice input signal (1001), comprising a high fidelity signal (for example, having an 8 kHz band width) is coupled to the compression/transmitter subsystem (1500). The voice signal (1001) is coupled to a microphone and amplifier subsystem (1010), which provides a signal output to a compression subsystem (1020), which operates in accordance with the present invention and teachings herein to provide a compressed and band shifted signal output (for example, having a 3.5 kHz bandwidth) which is coupled to the transmitter (1030) to provide an output over the telephone lines. A receiver system (1600) on the receiving telephone side receives the transmitted signal from the transmitter (1030) which is coupled to a receiver (1040) (which in some embodiments reverses any encoding or modulating done by the transmitter) to recover the 3.5 kHz compressed signal. A decompression subsystem (1050), in accordance with the present invention, decompresses and re-spreads the compressed signal responsive to the compressed signal including the code book signal to provide a high-fi signal output (1101) which is coupled to an amplifier and speaker (1060) which provides a voice sound output for the telephone's user such as through the ear piece speaker or speaker of the phone. Also, as illustrated in FIG. 7, each telephone is comprised of a compression and transmission system (1500) and a receiver and decompression system (1600) to permit bi-directional communication.

The present invention also finds application in many areas in addition to and outside of telephony, and can also be expanded beyond its application to only speech, by selection of appropriate bands of thresholds and code book parameters.

The above described embodiment of the invention takes advantage of the properties of speech phonemes whose energy is well defined in a limited and narrow frequency band that are unique to each speech phoneme. It also utilizes the sparseness properties of discrete wavelet transforms and of the filter bank nature of these transforms. These properties allow that compression as above is possible with almost no loss of information especially since it is performed in each of only a very few frequency bands, but where each such band pass filtered band is treated separately from the others. The limited number of frequency bands also allows for a simple code book to store and transmit the exact spectral location of each wavelet transform value before and after its shift from a higher frequency band to a lower one for compression purposes and vice versa for decompression.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A spectra compression system for compressing a spectrum of an input signal having a first predetermined bandwidth into a second predetermined bandwidth, the input signal containing information, the system comprising:

bandpass filter means for generating a plurality of filtered signals for each of a plurality of predetermined bandwidths, responsive to the input signal, power detector means, responsive to the filtered signals for generating a power signal indicative of a power level of each of the filtered signals;

comparator means for generating a decision signal in response to a comparison of the power signal to a predetermined threshold;

classifier means for generating a classification signal in response to the decision signal;

coding means for generating a code signal in response to the classification signal;

transform means for generating a plurality of transform values responsive to the plurality of filtered signals;

shifting means responsive to the decision signal and the plurality of transform values for moving the information from a first predetermined bandwidth of the plurality of predetermined bandwidths to a second predetermined bandwidth of the plurality of predetermined bandwidths, thus forming a compressed transform signal; and inverse transform means for generating a compressed signal responsive to the compressed transform signal and to the code signal.

2. The system as in claim 1 further comprising:

wavelet transform (WT) means for providing wavelet transform outputs for each band, said wavelet transform outputs comprising WT parameters having amplitudes responsive to the filtered signals;

wherein the power detector means generates the power signal responsive to detecting the amplitude of the WT parameters.

3. The system as in claim 1 wherein said transform means performs wavelet transforms, and said inverse transform means performs inverse wavelet transforms.

4. The system as in claim 3 wherein said wavelet transforms are discrete, and wherein said inverse wavelet transforms are discrete.

5. The system as in claim 1 wherein said predetermined threshold is different for each of said plurality of predetermined bandwidths.

6. The system as in claim 2 wherein said predetermined threshold is a percentage of the maximum value for the WT parameters for each respective one of the plurality of predetermined bandwidths.

7. The system as in claim 1 further characterized in that said bandpass filter means is comprised of a plurality of bandpass filters, each filter having a predetermined bandwidth, the plurality of bandpass filters thus forming a plurality of predetermined bandwidths and generating the plurality of filtered signals.

8. The system as in claim 7 wherein said power detector means is comprised of a plurality of power detector circuits, each associated with and responsive to a respective separate one of the plurality of bandpass filters for generating the power signal responsive to generating band power signal for each of the detector circuits.

9. The system as in claim 1 further characterized in that said power detector means is comprised of at least one power detector, responsive to the filtered signals, for generating a power signal indicative of a power level of each filtered signal.

10. The system as in claim 1 wherein the comparator means is comprised of at least one comparator circuit for generating the decision signal responsive to comparing transform values with the predetermined threshold value.

11. The system as in claim 1 wherein said shifting means is further comprised of means for additionally moving information from a third predetermined bandwidth of the plurality of predetermined bandwidths to a fourth predetermined bandwidth of the plurality of predetermined bandwidths, thus forming the compressed transform signal.

12. The system as in claim 1 wherein the first predetermined bandwidth is higher in frequency in frequency than the second bandwidth.

13. The system as in claim 11 wherein the third predetermined bandwidth is higher in frequency than the fourth predetermined bandwidth.

14. The system as in claim 1 wherein the coding means is further comprised of a code bandpass filter.

15. The system as in claim 1, further comprising a conditional switch, coupled to the input signal and the classification signal, the conditional switch outputting the input signal if the classification signal indicates a non-compression condition and the conditional switch outputting a null signal if the classification signal indicates a compression condition.

16. The system as in claim 1, further comprising a transmitter, coupled to the coding means, and the shifting means, the transmitter transmitting the code signal and the compressed signal if the classification signal indicates a compression condition and the transmitter transmitting the code signal and the input signal if the classification signal indicates a non-compression condition.

17. The system as in claim 15, further comprising a transmitter, coupled to the conditional switch, the coding means, and the shifting means, the transmitter transmitting the code signal and the compressed signal if the classification signal indicates a compression condition and the transmitter transmitting the code signal and the input signal if the classification signal indicates a non-compression condition.

18. A spectra compression system for compressing a spectrum of an input signal having a first bandwidth into a second bandwidth that is smaller than the first bandwidth, the input signal containing information, the system comprising:

a plurality of bandpass filters for generating a plurality of filtered signals, each bandpass filter having a predetermined bandwidth, the plurality of filtered signal thus being in a plurality of predetermined bandwidths, at least one of the plurality of predetermined bandwidths being in an upper band and the remaining predetermined bandwidths being in a lower band;

a plurality of power detectors, each power detector coupled to a different bandpass filter of the plurality of bandpass filters, each power detector generating a power level signal, indicative of the power level present in the respective filtered signal, in response to squaring an amplitude of the respective filtered signal and averaging the squared amplitude over a predetermined time interval;

a plurality of comparators, each comparator coupled to a different power detector of the plurality of power detectors, each comparator generating a decision signal in response to the power level signal being compared to a predetermined power threshold;

a classifier, coupled to the plurality of comparators, for generating a classification signal in response to the plurality of decision signals, the classification signal indicating a compression condition if at least one of the decision signals indicates that a power level in the upper band is greater than the predetermined power threshold, the classification signal indicating a non-compression condition if none of the decision signals indicate that a power level in the upper band is greater than the predetermined power threshold;

a code bandpass filter, coupled to the classifier, for generating a code signal indicative of the classification signal;

a wavelet transform circuit, coupled to the plurality of filtered signals, for generating a plurality of wavelet transform values;

a shifting circuit, coupled to the wavelet transform, the shifting circuit moving, in response to the classification output signal, the information from the upper band to the lower band, thus generating a plurality of shifted values located in the lower band; and an inverse wavelet transform circuit, coupled to the shifting circuit, for performing an inverse wavelet transform on the plurality of shifted values, thus producing a compressed signal responsive to the code signal.

19. The system of claim 18 and further comprising a transmitter, coupled to the inverse wavelet transform, for transmitting the code signal and the compressed signal if the compressed condition is indicated and the transmitter transmitting the input signal if the non-compressed condition is indicated.

20. The system as in claim 19 further comprising:

a conditional switch, having an output and being coupled to the input signal and the classifier, the switch allowing the input signal to pass to the output if the classification signal indicates the non-compression condition and the switch allowing a null signal to pass to the output if the classification signal indicates the compressed condition; and wherein the transmitter is coupled to the conditional switch and responsive to the conditional switch output.

21. The system as in claim 18 wherein the shifting circuit forms a plurality of compressed wavelet transform signals, and the inverse wavelet transform circuit generates an inverse transform signal representative of the compressed signal from the plurality of compressed wavelet transform signals.

22. A decompression system for selectively decompressing an input signal having information which may have been compressed into a lower frequency band of a plurality of frequency bands, the system comprising:

a receiver for receiving a compressed signal comprising information and a decompression code;

a plurality of band pass filters, coupled to the receiver, for generating a plurality of received filtered signals and a decompression code signal responsive to the compressed signal;

a classification circuit, coupled to a first band pass filter of the plurality of band pass filters, for generating a respreading code from the decompression code signal;

a wavelet transform circuit coupled to the plurality of band pass filters, the wavelet transform performing a wavelet transform on the plurality of received filtered signals to provide output of transformed signals;

a respreading circuit, coupled to the classification circuit, for selectively respreading the transformed from the lower frequency band to respective ones of the plurality of frequency bands, to provide an output of respread transformed signals in response to the respreading code; and an inverse wavelet transform, coupled to the respreading circuit, for generating a decompressed signal from the respread transformed signals.

23. The system as in claim 22, further comprising:

a conditional switch, responsive to the decompression code signal, for selectively outputting one of the decompressed signal and the input signal as a final signal output.

24. A method for compressing the spectrum of an input signal containing information, the method comprising the steps of:

filtering the input signal with a plurality of bandpass filters, each filter having a predetermined bandwidth, to generate a plurality of filtered signals having information;

detecting a power level in the plurality of filtered signals to generate a plurality of power signals, each signal indicative of the power level of a different filtered signal;

comparing the plurality of power signals to a predetermined threshold to generate at least one decision signal in response to a comparison of the power signal to a predetermined threshold;

generating a code signal in response to the result of comparing;

wavelet transforming the plurality of filtered signals to generate a plurality of wavelet transformed signals;

shifting, in response to the result of comparing, information in the plurality of wavelet transformed signals, from a first predetermined bandwidth of the plurality of predetermined bandwidths to a second predetermined bandwidth of the plurality of predetermined bandwidths, thus forming compressed wavelet transform signals; and inverse wavelet transforming the compressed wavelet transform signals into a compressed transmission signal.

25. The method of claim 24 and further including the step of classifying the result of comparing into a plurality of classes indicative of which predetermined bandwidth the information is located.

26. A system for speech compression and decompression for use with a high bandwidth speech incoming signal for preservation of high fidelity speech quality in a low bandwidth compressed signal, the system comprising:

an array of Band Pass (BP) filters having pass bands of 200–700 Hz (A), 700–1400 Hz (B), 1400–2800 Hz (C), 3500–5600 Hz (D), and 5600–11,200 Hz (E), at a sampling frequency of 22,400 Hz, and an anti-aliasing filter at 11,200 Hz, the array of BP filters receiving the incoming signal and outputting filtered signals;

a subsystem that produces at its output a signal that is proportional to a measure of power in the spectrum at each of the bands A–E, the subsystem squaring the amplitude of the output of each band and averaging this squared output over a time interval of approximately 20 milliseconds;

a decision circuit, coupled to the subsystem, that outputs a "yes" signal if the power in each band A–E is above a threshold value and a "no" signal otherwise, each threshold being pre-setable for each band;

a classifier subsystem for determining compression conditions responsive to the yes/no signals in each band to detect if the filtered signals belong to any of classes (a) to (b) where class (a) to (b) are such that:

(a) corresponds to all situations where no signal lies at bands D and E, and (b) corresponds to all other situations;

a circuit that shifts, if class (b) has been detected, the spectrum of the output of both bands A and B to band A by compressing the spectrum of bands A and B;

a sub-classification circuit for providing outputs $b_1$, $b_2$ or $b_3$ responsive to classification between and distinguishing sub-classes ($b_1$ to $b_3$) of class (b) as follows:

$b_1$: the power in both of the two highest frequency bands, bands D, E is above their respective thresholds, each of the bands A–E having a predefined threshold, b2: the power in band E is above its respective threshold, b3: the power in band D is above its threshold;

a band pass filter at 2800–3500 Hz (X), the band X band pass filter being used to output coding signals responsive to the outputs from the subclassification;

a wavelet transform (WT) sub-system that processes the filtered signals generating outputs of WT values, a shifting subsystem for shifting the WT values from one band to another, and providing a shifted output, wherein if $b_2$ has been detected then the WT values of WT band C are shifted to WT band B, and then the moved WT band C values are replaced by those from WT band E which are shifted to Band C;

wherein if sub-class $b_3$has been detected then the WT values of WT band B are shifted to WT band A and the WT values of WT band C are shifted to band B, and then the WT values of band D are moved to band C;

wherein if $b_1$ has been detected then the values of WT band B are moved to band A, then the WT values of band C are moved to band B, then the WT values of D are shifted to WT band B and the WT values of band E are moved to band C; and an inverse wavelet transform (IWT) stage, for providing a compressed signal output in bands A, B, and C, responsive to the shifted output and the output code signal.

27. The system as in claim 26 wherein the compression of the spectrum of the bands of A and B is by a predetermined ratio.

28. The system as in claim 26, wherein the compressed signal is transmitted.

29. The system as in claim 28 wherein the transmitted compressed signal is coupled to a receiver which reconstructs an approximation of the incoming signal responsive to the code signal and the compressed signal.

30. The system as in claim 29, wherein when moving WT values of any band down from higher to lower bandwidths by 1 band level, each other WT value of the higher band is skipped, and wherein when moving WT values down by 2 levels, each second and third and fourth value of the successive values is skipped, and when moving WT values up in the receiver side, in case of moving WT values up one band, every other value is the arithmetic average of the values on each of its sides, and when moving up 2 bands a linear interpolation between the values both sides is employed.

31. A system for compressing the spectrum of an input signal containing information, the system comprising:

means for filtering the input signal in a plurality of bands each having a pre-determined bandwidth, to generate a plurality of filtered signals having information;

means for detecting a power level in the plurality of filtered signals to generate a plurality of power signals, each of the power signals indicative of the power level of a different respective one of the filtered signals;

means for comparing the plurality of power signals to a pre-determined threshold to generate a decision signal in response to the comparison of at least one of the power signals to the pre-determined threshold;

means for generating a code signal in response to the decision signal;

means for wavelet transforming the plurality of filtered signals to generate a plurality of wavelet transformed signals;

means for shifting information in the plurality of wavelet transformed signals from a first pre-determined bandwidth of the plurality of predetermined bandwidths to a second predetermined bandwidth of the plurality of predetermined bandwidths, thus forming compressed wavelet transform signals responsive to the means for comparing; and means for inverse wavelet transforming the compressed wavelet transform signals into a compressed signal.

32. The system as in claim 31 further comprising:

means for classifying the result of comparing into a plurality of classes indicative of which predetermined bandwidth the shifted information is located.

33. The system as in claim 31 further comprising means for reconstructing an approximation of the input signal responsive to the compressed signal.

34. A telephony system for communicating telephonic signals from at least a first telephonic device to a second telephonic device, the telephonic signals containing information, the system comprising:

at least one receiver for receiving the telephonic signals; and a spectra compression system for compressing a spectrum of an input signal having a first predetermined bandwidth into a second predetermined bandwidth, the input signal containing information, the system comprising:

a plurality of bandpass filters, each filter having a predetermined bandwidth, the plurality of bandpass filters thus forming a plurality of predetermined bandwidths and generating a plurality of filtered signals;

at least one power detector, coupled to the plurality of bandpass filters, for generating a power signal indicative of a power level of each filtered signal;

at least one comparator, coupled to the at least one power detector, for generating at least one decision signal in response to a comparison of the power signal to a predetermined threshold;

a classifier, coupled to the at least one comparator, for generating a classification signal in response to the at least one decision signal;

a code bandpass filter, coupled to the classifier, for generating a code signal in response to the classification signal;

a transform circuit, coupled to the plurality of filtered signals, for generating a plurality of transform values;

a shifting circuit, coupled to the plurality of transform values, for moving, in response to the comparison, the information from a first predetermined bandwidth of the plurality of predetermined bandwidths to a second predetermined bandwidth of the plurality of predetermined bandwidths, thus forming at least one compressed transform signal;

an inverse transform circuit, coupled to the shifting circuit, for generating a compressed signal from the at least one compressed transform signal; and at least one transmitter for transmitting the telephonic signals.

* * * * *